May 13, 1958  J. H. BOOTH  2,834,271
PHOTOGRAPHIC PRODUCT
Filed Oct. 3, 1955
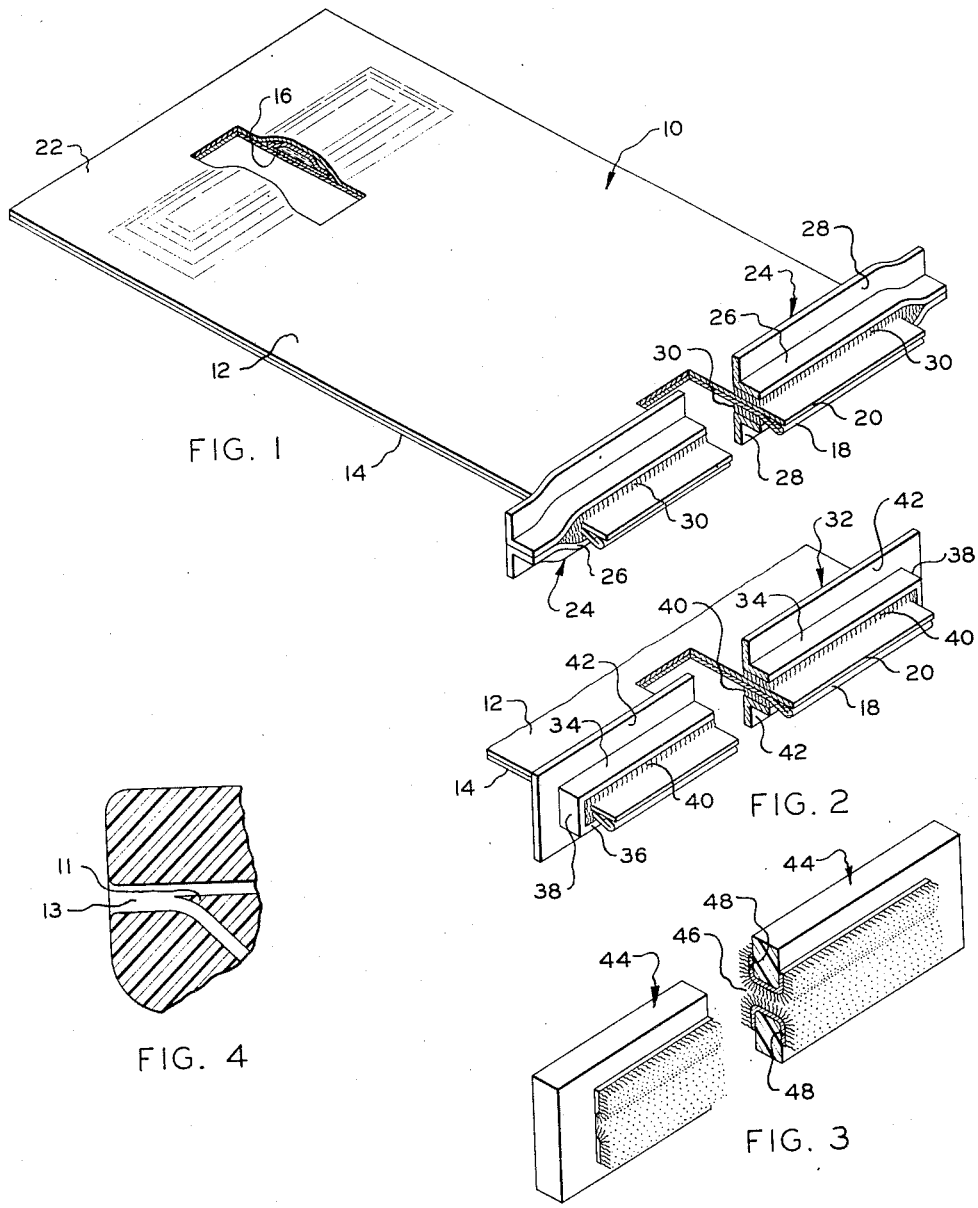
INVENTOR
Joseph H. Booth
BY Brown and Mikulka
and Robert E. Carb
ATTORNEYS

United States Patent Office 2,834,271
Patented May 13, 1958

2,834,271

PHOTOGRAPHIC PRODUCT

Joseph H. Booth, Belmont, Mass., assignor to Polaroid Corporation, Cambridge, Mass., a corporation of Delaware Application October 3, 1955, Serial No. 538,010

7 Claims. (Cl. 95—67)

This invention relates to photographic products and particularly to novel photographic film units.

Photographic film units of various types, and particularly film units of the self-processing type, have been proposed which are adapted to be introduced into a camera, wherein they are to be exposed, through a passage in the camera housing. A portion of the film unit is allowed to extend through the passage outside the camera and may be grasped for withdrawing the film unit from the camera following exposure. As a rule, the passage in the camera housing is slightly larger than the film unit to be introduced and is provided with light-sealing means adapted to engage the film unit and prevent the admission of light past the film unit into the camera. This type of light-sealing means usually takes the form of pads of pile fabric or flocking secured to the walls of the passage and adapted to engage the film unit, and has proved to be somewhat unsatisfactory since the flocking or pile fabric may deteriorate, become fouled with processing liquids used in film units, or become so worn with repeated use as to lose its light-sealing abilities; or the shape or thickness of the film unit to be moved through the passage may vary in the vicinity of its leading end to such an extent that adequate light sealing of the passage in this manner becomes difficult. The failure of light-sealing means due to deterioration and wear resulting from repeated use can be avoided by providing the light-sealing means as an element of each film unit.

Accordingly, it is an object of the present invention to provide, in combination with a film unit adapted to be introduced into a camera through a passage in the camera housing, a simple and inexpensive light-sealing element located in surrounding relation to said film unit and capable of engaging said camera and said film unit so as to prevent the admission of light through said passage during movement of said film unit therethrough.

The present invention is particularly concerned with film units of the self-processing type, that is, film units which include a photosensitive material adapted to be photoexposed and means containing a liquid in condition for distribution within the film unit and capable of participating in the processing of said film unit. Film units of this type may vary in shape and thickness throughout their length and in particular may be considerably thicker in the vicinity of their leading ends than over the remainder of their length, which may be of substantially uniform thickness. It is difficult to construct effective light seals of the type described which are capable of accommodating the enlarged end portion of a film unit and also engage and form a lighttight seal with the remaining smaller portion of the film unit.

The present invention has, as another of its objects, the provision, in a photographic film unit having an enlarged leading end section, of a light-sealing element, of the type described, initially disposed around said film unit at a location adjacent its enlarged end section and movable with respect to said film unit toward its other end during movement of said film unit commencing at its leading end through a passage.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawing wherein:

Figure 1 is a perspective view, partially in section, of a film unit embodying the present invention;

Figure 2 is a perspective view, partially in section, of another embodiment of the film unit of Fig. 1;

Fig. 3 is similar to Fig. 2, illustrating still another embodiment of the invention; and Fig. 4 is a fragmentary sectional view showing a portion of apparatus with which said film unit is adapted to be employed.

Self-processing photographic film units embodying the present invention may be of a variety of types for performing a number of processes and generally include a first element or sheet having a region provided with a stratum of photosensitive material, a second element or sheet including an area at least coextensive with said region and superposable therewith, and means, such as a collapsible container, for supplying a fluid for distribution upon said region of said first element. The fluid, for example, may be capable of developing a latent image in a photosensitive stratum on the first element when spread between it and the second element, or the fluid may contain the photosensitive material in condition to be spread between the first and second elements in the presence of a developer to provide a stratum which, when photoexposed shortly after being formed, receives a latent image that is developed spontaneously to form a visible photographic record. The fluid is spread in a layer between the elements of the film units formed, for example, of flexible sheet material such as paper or plastic by advancing the film unit between a pair of pressure-applying members. One or more containers carrying the processing liquid may be located between the elements of the film unit adjacent either or both ends of the film unit or the ends of the region of the film unit within which the liquid is to be distributed. The fluid containers may be of the type adapted to be moved with the film unit between a pair of pressure-applying members for spreading their liquid contents directly between the sheets, or may be adapted to be withdrawn from the film unit prior to spreading of the liquid and to discharge their contents during withdrawal from the film unit. The film unit is provided with the sheets thereof in superposed relation and is adapted to be introduced into the camera in this condition. One or both of the sheets, for example, may be transparent to actinic light or the sheets may be opaque, requiring that they be separated for exposure within the camera, or the film unit may be provided with opaque cover elements adapted to be stripped from the film unit as it is introduced into the camera.

A typical self-processing film unit, for example, capable of producing a positive photographic print, is illustrated at 10 in Fig. 1. Film unit 10 comprises a first sheet 12 including an area provided with a layer of photosensitive material, preferably an emulsion of silver halide in which a latent image can be attained by differential exposure to actinic light, a second sheet 14, including an area at least coextensive with the photosensitive layer and superposed therewith, adapted to serve as a support for a visible print of a latent image in the photosensitive layer, and a rupturable container 16 carrying a processing liquid for distribution between the photosensitive layer 12 and sheet 14. Second sheet 14 may include an image-receptive layer containing silver precipitating nuclei and the processing liquid may include a developer, a silver halide solvent and an alkali. The film unit is processed by distributing this processing liquid in a thin layer of uniform thickness between the photosensitive layer of sheet 12 and the image-receptive layer of sheet 14. In the presence of this layer of processing liquid, a latent image in the photosensitive layer is reduced to silver and a soluble silver complex, formed with the silver of unreduced silver halide, is transferred by imbibition to the image-receptive layer of second sheet 14 and there is reduced to silver to produce a positive image. Photographic materials generally useful in processes of this type are described in detail in Patent No. 2,543,181, issued February 27, 1951 to Edwin H. Land, and various other forms of film units capable of incorporation into the present invention are disclosed in U. S. Patents Nos. 2,609,296, issued September 2, 1952 and 2,495,111, issued January 17, 1950, both in the name of Edwin H. Land, and application Serial No. 429,185, filed May 12, 1954 in the name of Edwin H. Land et al.

Sheets 12 and 14 of film unit 10 are preferably opaque to actinic light and the film unit is provided with the sheets secured in superposition at least around the margins of the photosensitive area of first sheet 12. The two sheets are adapted to be separated from one another within a camera to permit the exposure of the photosensitive area and for this purpose are secured together by a suitable cement or adhesive material, for example, a linear polyamide, which forms a lighttight bond between the sheets, permits the sheets to be readily stripped apart and may also form a framing mask for the print produced in second sheet 14. The sheets are preferably separated as they are introduced through a passage into a camera. The sheets may be separated, for example, by advancing their leading ends against a wedge-shaped member, designated at 11 in Fig. 4, having an edge section adapted to project between the sheets and separate the sheets as they are moved through a passage 13 into the camera. In the form of film unit shown in Fig. 1, the leading end section 18 of sheet 14 is folded back upon itself against the leading edge section 20 of sheet 12. This arrangement facilitates separation of the sheets by lending a helpful rigidity to the leading end section of the film unit and by providing an initial separation of the sheets into which the wedge in the camera may easily project at the commencement of the separation of the sheets. The additional thickness imparted to the film unit by folding end section 18 makes it difficult to seal the passage in the camera by light-sealing elements including pile or flocking adapted to snugly engage the film unit since the light-sealing elements must be spaced far enough apart to allow the introduction of the enlarged leading end of the film unit, thereby decreasing the effectiveness of the light seal.

The end sections of the sheets opposite the leading end of the film unit are secured together, for example by a hinge, so as to register the sheets with respect to one another during withdrawal from a camera and to form a leader 22 by which the film unit may be grasped for withdrawing it from the camera. Containing 16 carrying a processing liquid is located between the sheets in the vicinity of this leader adjacent the edge of the photosensitive area of sheet 12 in position to distribute its contents between the area and an area of sheet 14 superposed therewith. Container 16 comprises an elongated strip of sheet material, preferably impervious to air, and the processing liquid is folded longitudinally and sealed at its edges to form a liquid-carrying cavity adapted to become unsealed along its longitudinal edge when subjected to compressive pressure. The film unit is adapted to be processed by progressively advancing it commencing at leader 22 between a pair of pressure-applying members for causing the liquid contents of container 16 to be discharged between the sheets where the liquid is spread in a thin layer by continued movement of the film unit between the presure-applying members.

One embodiment of the light-sealing means of the present invention is illustrated in Fig. 1 and comprises a pair of elongated light-sealing members 24 each being generally L-shaped in cross section and comprising a base section 26 and a dependent side section 28. Members 24 are secured together at their ends transversely of the film unit with their base sections juxtaposed and located adjacent opposite sides of the film unit. Members 24 may be secured around the film unit with side sections 28 located toward the leading end of the film unit or, as shown, with side sections 28 away from the leading end. Members 24 are formed of any suitable sheet material having some rigidity, such as stiff fabric or paper, cardboard, plastic material or sheet metal. To form a light seal between members 24 and film unit 10, a yielding material, such as soft rubber, felt, tufted fabric, flocking, pile or the like, generally designated at 30, is secured to the surfaces of base sections 26 located adjacent the film unit so as to snugly engage the film unit and prevent the passage of light between base sections 26 and sheets 12 and 14 comprising the film unit.

Film unit 10 is provided with members 24 located initially adjacent the leading end of the film unit and as the leading end is introduced into passage 13 in the camera, side sections 28 engage the camera housing 29 (Fig. 4) adjacent passage 13 to prevent the movement of members 24 through the passage and to preclude the entrance of light into the passage between members 24 and the camera housing. In the form shown, base sections 26 of members 24 may extend into passage 13, while sections 28 engage the housing adjacent the passage to form a lighttight joint; or alternatively when side sections 28 are located toward the leading end of the film unit, the side sections may be seated in a slight recess (not shown) in the camera housing surrounding the passage so as to form a lighttight joint, or side sections 28 may be provided with a yielding light-sealing material, for example flocking, pile, etc., adapted to form a lighttight contact with the housing wall. As the film unit is moved through the passage into the camera, members 24 remain stationary relative to the camera and the film unit moves between said members until the portion of the film unit, including container 16, starts to enter the passage. The film unit, on reaching this position, is ready for exposure with the two sheets separated and properly positioned within the camera. Suitable pressure-applying members (not shown) are secured to the camera and are located in operative position in engagement with leader 22 so that, following exposure of the film unit within the camera, it may be withdrawn from the camera between the pressure-applying members by pulling on the leader.

An alternative embodiment of the light-sealing means of the present invention is shown in Fig. 2 and comprises a light-sealing element 32 generally L-shaped in cross section and having a section extending around the film unit and including a forward wall 34 located adjacent sheet 14, a rear wall 36 located adjacent sheet 12 and end walls 38 located adjacent the edges of the sheets, the walls defining a passage through which the film unit extends. A yielding light-sealing material, designated at 40, of flocking, pile or the like, is secured in this passage to walls 34, 36 and 38 in engagement with the sheets to prevent the admission of light between the sheets and walls 34, 36 and 38. Element 32 includes a flange section or dependent wall 42 adapted to engage the housing of the camera adjacent the passage therein to form a lighttight joint, wall 42, if desired, also being provided with pile or flocking on one of its surfaces.

Another embodiment of the light-sealing means of the invention is shown in Fig. 3 and comprises an elongated substantially rigid member 44 several times thicker than the film unit and being provided with an elongated slot or passage 46 into which the film unit extends. Portions of member 44 comprising the sides of passage 46 are provided with a yielding light-sealing material such as a pile fabric, flocking 48, or the like, secured thereto so as to engage the portion of the film unit extending through the passage and thereby prevent the entrance of light around the film unit. The light-sealing material 48 may also be provided on the side of member 44 adapted to engage a camera housing, or member 44 may be seated in a recess in the camera housing to form a lighttight joint between the camera and member 44.

During withdrawal of a film unit from a camera between a pair of pressure-applying members, the sheets comprising the film unit are superposed and processing liquid is distributed in a layer between the exposed photosensitive layer and the sheet superposed therewith. The two sheets are retained in superposed relation either by readherence of the adhesive originally securing them together or by the layer of liquid between the sheets. In the latter case, the liquid preferably includes a material such as a dye which is opaque to actinic light and prevents admission of light between the sheets. Following a predetermined processing period during which the two sheets are maintained in super-position with the layer of liquid therebetween, the two sheets may be stripped apart and the light-sealing element of the film unit may, in view of its simple and inexpensive construction, be discarded.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. A photographic film unit including a pair of superposed sheets having a portion adapted to be introduced into a camera through a passage in the housing of said camera, said portion having an enlarged leading end section and the remainder of said portion being of substantially uniform width and thickness throughout its length, and a device for light-sealing said passage during introduction of said film unit therethrough, said device being secured in surrounding relation to said portion of said film unit adjacent said enlarged leading end section and including at least a pair of difficultly deformable members disposed on opposite sides of said sheets and having opposed surface portions located substantially parallel with one another and a pliant material secured to at least said surface portions between the latter and the outer surfaces of said sheets for contacting transverse areas of said sheets in a lighttight manner, said members being so constructed as to engage the housing of a camera in a lighttight manner in the region of a passage therein through which said sheets are introduced, said device being movable in lighttight engagement with the first mentioned portion of said sheets during movement thereof commencing at said leading end section through said passage.

2. A photographic film unit comprising a section adapted to be introduced into a camera through a passage in the housing of said camera, said section including a sheetlike photosensitive element, and another sheetlike element superposed with said photosensitive element, the leading end portion of said section being enlarged and said section being of substantially uniform width and thickness throughout the remainder thereof, means containing a fluid processing reagent for distribution between said sheets, and a device for light-sealing said passage during introduction of said film unit therethrough, said device being secured in surrounding relation to said film unit adjacent said enlarged leading end portion thereof and including a pair of difficultly deformable members disposed on opposite sides of said sheets and having opposed surface portions located substantially parallel with one another and a pliant material secured to at least said surface portions of said members between the latter and the outer surfaces of said elements for contacting transverse areas of said elements in a lighttight manner, said members being so constructed as to engage the housing of a camera in a lighttight manner in the region of a passage therein through which said elements are introduced, said device being movable in lighttight engagement with said section of said film unit toward the trailing end thereof during movement of said film unit commencing at said leading end portion through said passage.

3. A photographic film unit adapted to be introduced into a photographic apparatus through a passage in the housing of said apparatus, said film unit comprising a pair of sheets superposed with one another and including co-extensive portions adapted to be introduced into said apparatus through said passage, said portions of said sheets having a leading end section substantially greater in thickness than the remainder of said portions of said sheets adapted to be introduced through said passage, a container carrying a fluid processing reagent adapted to be distributed between said sheets, said container being located between said sheets adjacent the other end of said portions remote from said leading end section, and a device for light-sealing said passage during introduction of said sheets therethrough, said device comprising a pair of difficultly deformable members secured together on opposite sides of said sheets adjacent said leading end section and extending transversely of said sheets, said difficultly deformable members having opposed surface portions substantially parallel with one another and engagement portions for coacting with said housing of said apparatus for preventing the admission of light through said passage in said housing during movement of said sheets through said passage, and a pliant yielding material secured to at least said surface portions of said members and extending between said members and said sheets for engaging transverse areas of the outer surfaces of said sheets comprising said film unit in a lighttight manner, said device being slidable in lighttight engagement with said sheets from a position adjacent said leading end section toward said other end and said container during movement of said sheets through said passage.

4. The film unit of claim 3 wherein said pliant yielding material is flocking.

5. The film unit of claim 3 wherein said pliant yielding material comprises a pile fabric with the pile in snug contact with the outside surfaces and edges of said sheets.

6. The film unit of claim 3 wherein each of said difficultly deformable members comprises an element having a generally L-shaped cross section including a base providing one of said parallel surface portions, said pliant yielding material being secured to said surface portion of said base.

7. The film unit of claim 6 wherein said difficultly deformable members comprise a substantially stiff pile fabric with the pile on said bases of said members being located between said members in lighttight engagement with said sheets.

References Cited in the file of this patent

UNITED STATES PATENTS

| 743,216 | Bacon | Nov. 3, 1903 |
| 1,305,095 | Hansen | May 27, 1919 |
| 2,110,486 | Isaac | Mar. 8, 1938 |
| 2,497,816 | Greenhalgh | Feb. 14, 1950 |
| 2,638,826 | Fairbanks | May 19, 1953 |